United States Patent
Paggios et al.

(10) Patent No.: US 8,962,051 B2
(45) Date of Patent: Feb. 24, 2015

(54) PROCESS FOR PRODUCING A CONFECTIONERY PRODUCT

(75) Inventors: Konstantinos Paggios, Munich (DE); Martin Richard Thiele, Holzkirchen (DE); Hartmut Heinrich Balzer, Petershausen (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 220 days.

(21) Appl. No.: 12/832,756

(22) Filed: Jul. 8, 2010

(65) Prior Publication Data

US 2011/0008521 A1 Jan. 13, 2011

(30) Foreign Application Priority Data

Jul. 9, 2009 (EP) .................................. 09165039

(51) Int. Cl.
| | | |
|---|---|---|
| A23P 1/08 | (2006.01) |
| A23G 1/00 | (2006.01) |
| A23G 1/04 | (2006.01) |
| A23G 1/30 | (2006.01) |
| A23G 1/32 | (2006.01) |
| A23G 1/40 | (2006.01) |
| A23G 1/54 | (2006.01) |
| A23G 3/34 | (2006.01) |

(Continued)

(52) U.S. Cl.
CPC ............... *A23G 1/04* (2013.01); *A23G 1/0053* (2013.01); *A23G 1/305* (2013.01); *A23G 1/325* (2013.01); *A23G 1/40* (2013.01); *A23G 1/54* (2013.01); *A23G 3/0089* (2013.01); *A23G 3/2092* (2013.01); *A23G 3/26* (2013.01); *A23G 3/343* (2013.01); *A23G 2200/06* (2013.01); *A23G 2210/00* (2013.01)
USPC ............ 426/305; 426/307; 426/548; 426/659

(58) Field of Classification Search
None
See application file for complete search history.

(56) References Cited

U.S. PATENT DOCUMENTS

| | | | |
|---|---|---|---|
| 2,904,438 A | | 9/1959 | O'Rourke |
| 2,977,231 A | * | 3/1961 | Palley et al. .................. 426/116 |
| 3,556,814 A | * | 1/1971 | Whitman et al. ............. 426/307 |

(Continued)

FOREIGN PATENT DOCUMENTS

| | | |
|---|---|---|
| CH | 410607 | 3/1966 |
| CH | 662041 | 9/1987 |

(Continued)

OTHER PUBLICATIONS

Afoakwa, E. O.; Patterson, A.; Fowler, M.; Viera, J.; "Influence of tempering and fat crystallization behaviours on microstructural and melting properties in dark chocolate systems" Food Research International, Jan. 2009, pp. 200-209, XP002554670.

(Continued)

*Primary Examiner* — Carolyn Paden
(74) *Attorney, Agent, or Firm* — Fitch, Even, Tabin & Flannery LLP

(57) ABSTRACT

The disclosure relates to a process for producing a confectionery product comprising heat resistant chocolate or a heat resistant compound mass and to the confectionery product, which is produced by this process. The process utilizes spraying water and/or a polyol (such as a sugar alcohol or a sugar) solution onto chocolate or a compound mass thereby inducing the formation of heat resistant chocolate or a heat resistant compound mass.

27 Claims, 3 Drawing Sheets

(51) Int. Cl.
*A23G 3/20* (2006.01)
*A23G 3/26* (2006.01)

(56) References Cited

U.S. PATENT DOCUMENTS

| | | | |
|---|---|---|---|
| 4,293,570 | A | 10/1981 | Vadasz |
| 4,812,318 | A | 3/1989 | Finkel |
| 4,980,192 | A | 12/1990 | Finkel |
| 5,108,769 | A | 4/1992 | Kincs |
| 5,149,560 | A | 9/1992 | Kealey |
| 5,160,760 | A | 11/1992 | Takemori |
| 5,480,664 | A | 1/1996 | Ferrero |
| 5,486,376 | A | 1/1996 | Alander |
| 6,165,540 | A | 12/2000 | Traitler |
| 6,194,014 | B1 * | 2/2001 | Busse et al. ............ 426/249 |
| 6,468,561 | B1 | 10/2002 | Grillo |
| 6,488,979 | B1 | 12/2002 | Davila |
| 6,524,634 | B2 * | 2/2003 | Busse et al. ............ 426/100 |
| 6,689,406 | B2 * | 2/2004 | Kuehl et al. ............ 426/303 |
| 7,427,420 | B2 * | 9/2008 | Senba et al. ............ 426/306 |
| 7,618,666 | B2 * | 11/2009 | Morando ............ 426/306 |
| 2003/0031762 | A1 | 2/2003 | Senba et al. |
| 2006/0040127 | A1 | 2/2006 | Spitsberg |
| 2006/0198924 | A1 | 9/2006 | Song |
| 2007/0048418 | A1 * | 3/2007 | Johnston et al. ............ 426/302 |
| 2007/0092607 | A1 * | 4/2007 | Johnston et al. ............ 426/89 |
| 2007/0116853 | A1 | 5/2007 | Krohn |
| 2007/0259070 | A1 | 11/2007 | Song |
| 2008/0026131 | A1 | 1/2008 | Benjamin |
| 2012/0148721 | A1 * | 6/2012 | Halliday et al. ............ 426/593 |

FOREIGN PATENT DOCUMENTS

| | | |
|---|---|---|
| CN | 1075608 | 9/1993 |
| EP | 0033718 | 8/1981 |
| EP | 770332 B1 | 5/2001 |
| EP | 1673977 | 6/2006 |
| EP | 1985188 A1 | 10/2008 |
| FR | 2892605 A1 | 5/2007 |
| GB | 1000159 | 8/1965 |
| JP | 60145049 | 7/1985 |
| JP | H4248950 | 9/1992 |
| JP | 20189059 | 7/2000 |
| JP | 27300861 | 11/2007 |
| KR | 2050592 | 6/2002 |
| WO | 0170195 | 9/2001 |
| WO | 2006040127 | 4/2006 |
| WO | 2007133219 | 11/2007 |

OTHER PUBLICATIONS

Communication from the Examining Division of the European Patent Office; EP Application No. 09165039.0, dated Apr. 4, 2011, 10 pages.
European Patent Office Extended European Search Report for European Application No. 09165039.0, dated Nov. 30, 2009, 8 pages.
New Sugar Chocolate Formula, Cai Yunsheng, p. 394 and 409, China Light Industry Press, first edition in Apr. 2002, cited in Office Action relating to corresponding Chinese Application No. 201010231058.9, dated May 21, 2013, 12 pages.
Notice of Opposition filed by Nestec S.A. against EP 2272377 B1; dated Jun. 5, 2013; 20 pages.
Office Action relating to corresponding Chinese Application No. 201010231058.9 and English Translation thereof, dated May 21, 2013, 20 pages.
Reply of the patent proprietor to the notice(s) of opposition, European Patent No. 2272377, dated Jan. 20, 2014, 10 pages.
Opponent's Remarks to Proprieter's Reply of Jan. 20, 2014, European Patent No. 2272377, dated Jun. 27, 2014, 16 pages.
Shirley O. Corriher, "BakeWise: The Hows and Whys of Succesful Baking." 2008, Confident Cooking, Inc., pp. 104-105.

* cited by examiner

PROCESS FOR PRODUCING A CONFECTIONERY PRODUCT

CROSS-REFERENCE TO RELATED APPLICATION

This application claims priority to European Patent Application No. EP 09165039.0, filed Jul. 9, 2009, which is incorporated by reference herein in its entirety.

FIELD

The disclosure relates to a process for producing a confectionery product comprising heat resistant chocolate or a heat resistant compound mass and to the confectionery product, which is produced by this process. The process utilizes spraying water and/or a polyol (such as a sugar alcohol or a sugar) solution onto chocolate or a compound mass thereby inducing the formation of heat resistant chocolate or a heat resistant compound mass.

BACKGROUND

Heat resistant chocolate products are of particular interest for hot countries, where conventional chocolate products become soft and sticky at temperatures of 30° C. or higher. Therefore, it is desirable to provide a heat-resistant chocolate product, which can withstand temperatures of 30° C. or more without becoming soft and sticky.

Heat resistant chocolate may be applied for solid tablets or bars as well as compounded or enrobed products such as chocolate coated wafers, biscuits or the like.

Many published (patent) documents are known which disclose methods of producing heat resistant chocolate products. The majority of these patents, however, describe the production of solid tablets or bars, while compounded or enrobed products cannot be produced by the disclosed technologies.

Examples are U.S. Pat. No. 6,488,979 and U.S. Pat. No. 4,980,192 (and many others). In U.S. Pat. No. 6,488,979 and U.S. Pat. No. 4,980,192 a method for preparing heat resistant chocolate is described, wherein a polyol, such as glycerine or sorbitol, is admixed to conventional chocolate. The major drawback of this method is the short working time remaining upon mixing before the mixture is firming up. The same problem occurs when mixing conventional chocolate mass with a water-containing phase. This may be overcome by different means to encapsulate water (e.g. by emulsions or saturated polyol solutions) and/or to reduce the mixing time (e.g. static mixers).

In U.S. Pat. No. 5,149,560, U.S. Pat. No. 5,160,760, U.S. Pat. No. 5,486,376 and U.S. Pat. No. 6,165,540 similar methods based on the use of a water-in-oil emulsion for preparing heat-resistant chocolate are described. Mixing the polyol encapsulated in an emulsion with chocolate gives a limited extension of working time which is suitable for a more convenient production of solid chocolate products, but not for the production of compounded or enrobed products with interiors or inclusions or which are filled.

Another example for using emulsions as encapsulation media is disclosed in EP 0 033 718. Therein a chocolate composition for the preparation of heat resistant chocolate articles, a process for its manufacture and its working into food stuff articles are described. The method comprises dispersing into a mass of couched chocolate, which may optionally be tempered, an emulsion of "water in a fat substance", of which at least a fraction is in solidified form, such dispersing being carried out at a temperature where said mass, although in fluid form, is in a condition of melt equilibrium with the crystallization germs of the fat substance therein. Furthermore, this document discloses a tropicalized chocolate article or article containing tropicalized chocolate.

GB 1,000,159 discloses a heat resistant chocolate article and a process for its manufacture. Specifically, it describes a heat resistant chocolate article which does not adhere to the wrapper at temperatures exceeding 30° C. The document discloses the preparation of a finely ground amorphous sugar mixture from sucrose and an anti-crystallizing substance such as glucose syrup or invert sugar. This amorphous sugar mixture (at 1-10%) is then mixed with a couched conventional chocolate mass (or "compound mass") that contains crystalline sucrose. The mass is then tempered in the conventional way followed by shaping and cooling. After hermetically wrapping, the product is stored for between 10 and 60 days at 20° C. and 35° C. During this treatment the amorphous sugar particles stick together forming a sponge like network that prevents collapse at more elevated temperatures. This approach could theoretically be applied for compounded or enrobed products but due to the amorphous sugar, viscosities are too high for use in conventional enrobing machines.

In a second step when water is added, in order to show heat resistance, a "sugar skeleton" must be built up which is usually done by a thermal curing of chocolate (e.g. 2 weeks at >30° C.). EP 1 673 977 discloses a process for manufacturing heat-resistant chocolate or chocolate-like confectionery products wherein an accelerated curing by microwaving is employed. During said process (I) a chocolate mass or a chocolate-like confectionery mass which has been mixed with a water-in-oil emulsion or (II) a chocolate mass or chocolate-like confectionery mass having an increased water content is moulded and then subjected to microwave treatment prior to and/or during cooling to induce the formation of a secondary microstructure and provide heat resistance. Basically, the innovative step of using microwave treatment for accelerated curing is also applicable for enrobed products. However, when mixing chocolate with a sorbitol solution the before-mentioned process using a W/O emulsion of the polyol is applied, which has the drawback that it is only applicable for solid tablets/bars.

U.S. Pat. No. 2,904,438 discloses a process for producing heat resistant chocolate, which may be applied for compounded or enrobed products too, wherein a controlled humidity of the contacting atmosphere surrounding the shaped product is maintained. During said process a heat resistant milk chocolate product which comprises ingredients of a milk chocolate product with a protein and a humectant (i.e. an edible hygroscopic compound) is prepared. The improvement consists in maintaining a controlled humidity of the contacting atmosphere during the roll refining operation at below 45% relative humidity, and then, after the forming step, maintaining a controlled humidity of the contacting atmosphere on the shaped product at above 50% relative humidity at a temperature below the melting point of the composition for a period of time sufficient to render the chocolate self-sustaining at temperatures above the melting point of cocoa butter. Furthermore, this document discloses a heat resistant milk chocolate product obtained by this method. Suitable humectants are inter alia mannitol, propylene glycol, glycerine, sorbitol and the like. Preferably, humidifying takes place after the composition has been formed into its final shape, e.g. when wrapped in moisture permeable packing.

A further embodiment of the process described in U.S. Pat. No. 2,904,438 is disclosed in CH 410 607. Therein, the maintenance of the controlled humidity of the contacting atmosphere on the shaped product at above 50% after the forming step is achieved by steadily moving the product through a moisturization chamber. The speed of moving is adjusted in a way that the amount of moisture, which has been taken up by the product before it leaves the chamber, is sufficient to prevent it from melting at temperatures above the melting point of cocoa butter.

However, in practice this kind of producing heat resistant chocolate can hardly be applied to compounded or enrobed chocolate confectionaries, which themselves exhibit water absorbing properties, such as biscuits, wafers and the like, and whose quality is thus adversely affected by the absorption of water. Moreover, in a chocolate coated product delamination of the chocolate coating from the interior may be observed during such processes The interior which usually has low moisture content and therefore being hygroscopic, is absorbing moisture from the high rel. humidity atmosphere thus expanding its volume which is the typical root cause for delamination. It also takes a long time and therefore this method is not suited for mass production. Further drawbacks are sugar bloom once the moisture is condensing on the product and an inhomogeneous distribution of water, which only migrates into the outer shell of the chocolate, thereby creating a hard crust, which is quickly destroyed upon touching, and under which the remaining chocolate is not heat resistant.

In U.S. Pat. No. 4,812,318 the problem of accelerated firming after mixing conventional chocolate and a polyol solution is solved by an extrusion approach. Utilizing concentric nozzles the chocolate is after the addition of the polyol simultaneously co-extruded with a non-aqueous stabilized batter material. The co-extruded entity is then briefly cooked in a microwave oven in order to obtain a wafer batter coated with heat resistant chocolate. Drawbacks of this approach are that during microwave cooking tempering of the chocolate is destroyed and that a certain thickness of the prepared shell is required.

US 2007/0259070 describes a process for coating a confectionery product with a polyol, such as sorbitol, by an atomizing spray application of the molten polyol. Afterwards an infra-red treatment is applied for drying the coating.

US 2006/0198924 describes a similar process of using pure sorbitol at high temperatures close to its melting point for the preparation of a coated confectionery product, wherein the molten sorbitol is sprayed on a confectionery product and wherein a drying air flow may be supplied to the confectionery while the coating layer(s) is/are applied.

However, these approaches deliver a hard sorbitol shell which does not resemble chocolate in its appearance. Moreover, molten sorbitol requires a high temperature which destroys the tempering of the chocolate and liquefies the chocolate which will eventually bloom and which will harm the shape. Thus, these approaches would only work for coating harder confectionery products not comprising chocolate such as candies, fudge or the like.

US 2006/0198924 also describes a pancoating process. Pancoating is in general applicable for small bites as well as fragile centers such as puffed cereals, wafers or biscuits. However, for panning a more or less spherical shape of the centers is required, i.e. it does not work for tablets, bars and the like.

WO 2006/040127 discloses a process for coating a confectionery product (e.g. chocolate) on all sides except one with a thin film, which preferably comprises modified starches, plasticizers, an acidity regulator and emulsifier, dissolved or dispersed in water. Also, film coatings using compounds such as sugars, waxes, shellac or polyols may be suitable, so as to provide the product with an improved heat stability. This film is applied as a protective layer onto the chocolate and does not change the properties of the chocolate itself.

In U.S. Pat. No. 3,556,814 a process is described wherein a chocolate coated candy bar is covered with a protective surface by dipping it into a propylene glycol-gelatin-sorbitol melt at 110° C. However, this approach does not deliver a homogeneous coating layer of heat resistant chocolate but two separated layers and the outer layer does not resemble chocolate like appearance, but would deliver a grayish, white surface. Also, within the inner layer—due to the high temperature during the process—all tempering of chocolate will be destroyed leading to uncontrolled re-crystallization of chocolate and thus to fat bloom and crumbly texture. Due to the high temperature, also the shape will suffer.

In summary, none of the processes described in the prior art allows for the production of a confectionery product comprising heat resistant chocolate or a heat resistant compound mass, wherein the above described problems, in particular the preparation of compounded or enrobed products such as heat resistant chocolate coated wafers, biscuits or the like, are solved.

SUMMARY

In view of the processes described in the prior art, the present inventors have developed a process for producing a confectionery product comprising heat resistant chocolate or a heat resistant compound mass, wherein the heat resistant chocolate or the heat resistant compound mass are formed during the production process.

In particular, the inventors have for the first time developed a process for producing a confectionery product comprising an interior enrobed with heat resistant chocolate or a heat resistant compound mass, wherein the heat resistant chocolate or the heat resistant compound mass are formed during the production process.

The disclosure relates to a process for producing a confectionery product comprising the step of spraying water or a polyol solution onto chocolate or a compound mass. Spraying water or a polyol solution is the preferred and 'standard' procedure, but it is also possible that water and a polyol solution are sprayed.

In a preferred embodiment, the process comprises the step of providing said chocolate or compound mass by way of spray deposition.

In a further preferred embodiment, water or a polyol solution are simultaneously sprayed with said chocolate or compound mass in one layer.

Alternatively, water or a polyol solution are alternately sprayed with said chocolate or compound mass in two or more layers.

In another aspect, the disclosure relates to an apparatus for producing a confectionery product comprising a means for spraying water or a polyol solution onto chocolate or a compound mass.

In still another aspect, the disclosure relates to an apparatus for producing a confectionery product comprising a means for spraying water or a polyol solution and a means for spraying chocolate or a compound mass.

In a further aspect, the disclosure relates to a confectionery product obtainable by the process described herein.

DETAILED DESCRIPTION

Figure 1:
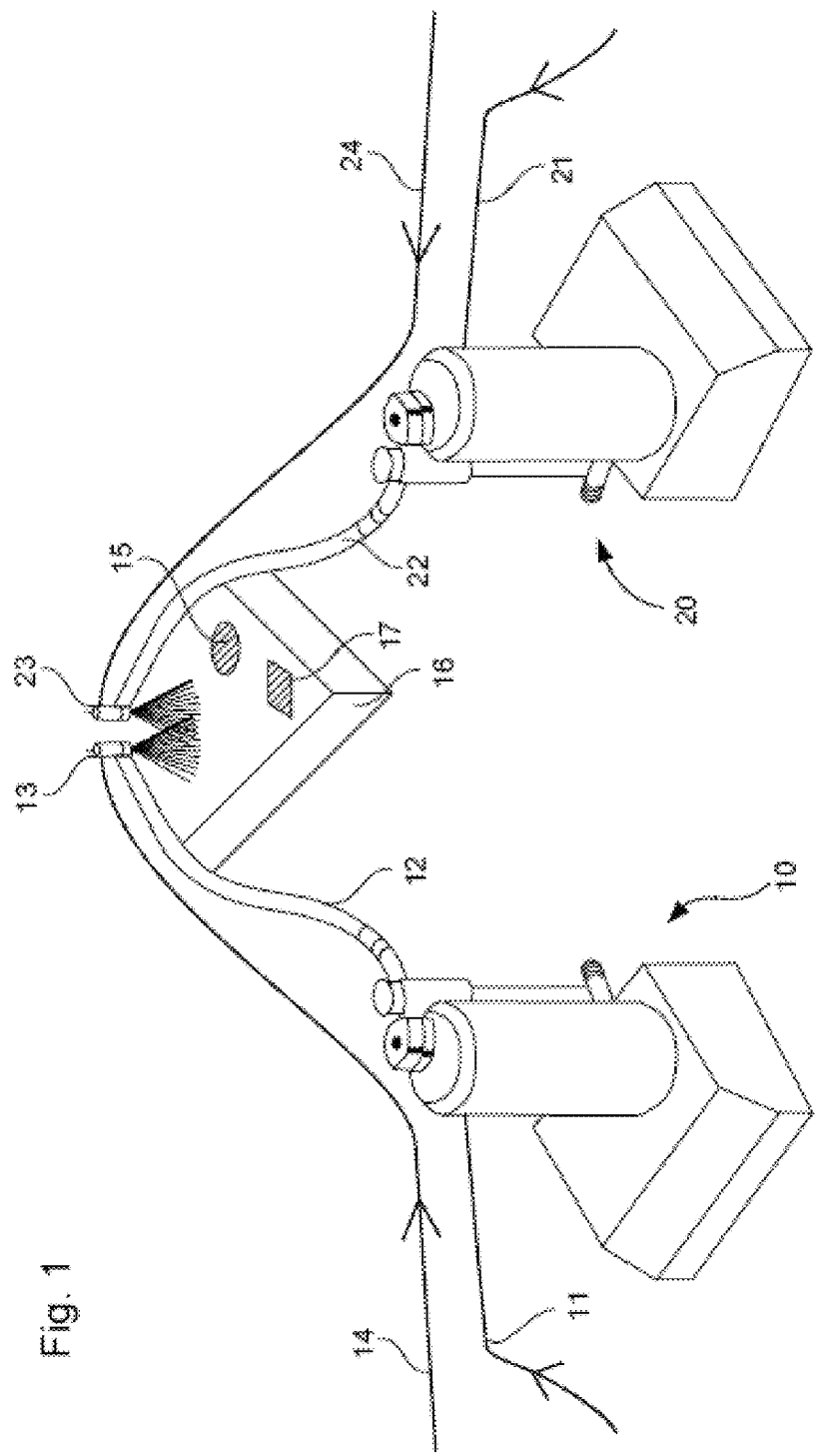
FIG. 1 shows one embodiment of a spraying apparatus for producing a confectionery product by the process provided herein.

There is provided a process for producing a confectionery product comprising heat resistant chocolate or a heat resistant compound mass, which allows for the formation of the heat resistant chocolate or the heat resistant compound mass during the production process.

In a particular preferred embodiment, there is provided a process for producing a confectionery product comprising an interior enrobed with heat resistant chocolate or a heat resistant compound mass, which allows for the formation of the heat resistant chocolate or the heat resistant compound mass during the production process.

The interior may be a wafer, a biscuit or the like.

In accordance with the process provided herein, the heat resistant chocolate or the heat resistant compound mass are prepared by spraying water or a polyol solution onto the chocolate or a compound mass.

In a preferred embodiment, the chocolate or the compound mass are provided by way of spray deposition.

In another preferred embodiment, water or a polyol solution may simultaneously be sprayed with the chocolate or the compound mass, which results in one homogenous layer. Confectionery products may be prepared comprising 1, 2, 3 or more of these homogenous layers.

In a further embodiment, water or a polyol solution are alternately sprayed with the chocolate or the compound mass, which results in at least two or more layers, for example 2 or 3 layers. Obtaining more than 3 layers is also feasible by applying the process described herein.

Also, confectionery products comprising more than 6 layers of water or a polyol solution and chocolate or a compound mass may be produced by the process described herein.

In a preferred embodiment, a confectionery product comprising a low number of up to 3 layers is prepared. However, depending on the overall thickness of the resulting heat resistant chocolate or the resulting heat resistant compound mass a higher number than 3 layers can be preferred.

If water or a polyol solution are employed in the process described herein, they may each be sprayed onto separate chocolate layers or they may subsequently be sprayed onto one single chocolate layer.

There is no specific sequence of the different layers of chocolate or a compound mass and water or a polyol solution required.

In a preferred embodiment, water or a polyol solution are sprayed as outmost layer.

In general, simultaneously spraying water or a polyol solution with the chocolate or the compound mass is most preferred, while alternately spraying water or a polyol solution with the chocolate or the compound mass is also preferred.

During the process described herein, spraying of water or a polyol solution and chocolate or a compound mass is performed by applying atomizing spray nozzles.

In a preferred embodiment, when alternately spraying, one single fluid nozzle system for spraying water or a polyol solution and one further single nozzle system for spraying chocolate or a compound mass are applied in the process described herein.

In another embodiment, when simultaneously spraying, a two fluid nozzles system for spraying water or a polyol solution and chocolate or a compound mass is applied in the process described herein.

In general, the spraying system applied in the process described herein comprises separate tanks, pipings and nozzles for each of the components to be sprayed, i.e. water or a polyol solution as well as chocolate or a compound mass. Hence, there is one tank, piping and nozzle, respectively, dedicated for each of the components to be sprayed.

Atomization of water or a polyol solution and chocolate or a compound mass may be achieved by gas or by other means, e.g. by ultrasound or airless simply by high pump pressure (e.g. 50-150 bar).

When gas atomization is applied, the nozzles used in the process described herein (both one fluid and two fluid nozzles) are additionally equipped with a gas inlet and a mixing chamber such as JAU-type nozzles from Spray Systems. Air/chocolate mixing may also take place outside the nozzle such as VAU-type nozzles from Spray Systems. In general, the nozzles may be different types requiring only the need to handle viscous suspensions like chocolate or sugar solutions.

The gas applied for atomizing water or a polyol solution and chocolate or a compound mass may be air, oxygen or an inert gas, such as nitrogen gas.

In case of gas atomization with a close chocolate or compound mass tank, the pressure of the chocolate or compound mass stream [applied inside the tank dedicated for chocolate or compound mass] for spraying chocolate or a compound mass by a one fluid nozzle is adjusted to 0-6 bar and preferably to 1-3 bar. The pressure controls the amount of the sprayed chocolate/compound mass, i.e. a high pressure provides for more chocolate/compound mass deposited.

In case of gas atomization with an open chocolate or compound mass tank, the amount of the chocolate or the compound mass stream is controlled by an independent dosing pump.

The pressure of the gas stream applied for atomizing chocolate or compound mass (e.g. an air or nitrogen stream) by a one fluid nozzle is adjusted to 0-2.5 bar and preferably to 0.5-1.5 bar. The pressure controls the distribution span/pattern of the sprayed matter.

The pressure of the water or polyol solution stream [applied inside the tank dedicated for water or a polyol solution] for spraying water or a polyol solution by a one fluid nozzle is adjusted to 0-4 bar and preferably to 2.5 bar. The pressure controls the amount of the sprayed water or polyol solution, i.e. a high pressure provides for more water or polyol solution deposited.

The pressure of the gas stream applied for atomizing water or a polyol solution (e.g. an air or nitrogen stream) by a one fluid nozzle is adjusted to 0-0.5 bar and preferably to 0.5 bar. The pressure controls the distribution span/pattern of the sprayed matter.

When another atomization than gas atomization is performed and depending on the apparatus used different pressure settings than the above may be applied in the process described herein.

By adjusting the spraying pressure and the length of the spraying intervals, the process described herein allows for precisely controlling the thickness of the layer of heat resistant chocolate or heat resistant compound mass, respectively.

The preferred spraying intervals last from 2.5 sec for the water or polyol layer to 5 sec for the chocolate or compound mass layer.

The chocolate or the compound mass may be sprayed in one or more strokes and preferably in three strokes, wherein each stroke preferably lasts 5 sec.

When applied simultaneously with chocolate or a compound mass, water or a polyol solution are sprayed in parallel with the stroke(s) of the chocolate or the compound mass.

In a further embodiment water or a polyol solution are sprayed just before the end of each stroke of the chocolate or the compound mass, preferably just before the end of some of the strokes of the chocolate or the compound mass and most preferably just before the end of the last stroke of the chocolate or the compound mass.

"Just before the end" as used herein describes a period of 0.5-5 sec, preferably 2.5 sec.

The resulting thickness of the layer of heat resistant chocolate or heat resistant compound mass, respectively, is in a range between 0 and 4 mm for enrobed products.

In a preferred embodiment, the thickness is 1-2 mm for enrobed products.

During the process described herein, the chocolate or the compound mass and the water or the polyol solution have the same temperature.

The temperature is in a range, which provides for sufficiently low viscosity of the chocolate or the compound mass in order to ensure interaction of water or a polyol with the crystallization process of the chocolate or the compound mass, which is the necessary prerequisite for the formation of heat resistant chocolate or a heat resistant compound mass.

That is, the temperature is adjusted and maintained during the process in a way that the crystalline state of the chocolate or the compound mass is relaxed to an extent, which allows for the interaction of water or polyol molecules with the crystallization process of the chocolate or the compound mass.

The temperature of the chocolate and the water or the polyol solution applied in the process described herein is in a range between 29 and 35° C. and preferably in a range between 30 and 31.5° C. In case of chocolate this means that the temperature applied neither allows crystallization (hardening) nor loss of tempering, i.e. the presence of cocoa butter seed crystals. In essence, the temperature should be kept between 30 and 31.5° C. all the time.

The temperature of the compound mass and the water or the polyol solution applied in the process described herein is in a range between 30 and 45° C. and preferably is 40° C.

In the process described herein, sufficient time is provided during which the described temperatures are maintained to ensure mixing of the water or polyol phase and the chocolate or compound mass phase.

That is, the hardening/drying intervals between each spraying step are adjusted in a way to ensure that the temperature of the chocolate or the compound mass and the water or the polyol solution does not fall below the above described desired value. Preferably, the hardening/drying intervals are shorter than 1 sec or last from 1 to 10 sec.

Suitable viscosity values for both chocolate and compound mass are at most 35 Pa·s. Also, viscosity values of <3 Pa·s and ranging from 3-4 Pa·s, 4-8 Pa·s, 8-12 Pa·s, 12-15 Pa·s, 15-22 Pa·s and preferably from 0.5-3 Pa·s are suitable for the process described herein.

Optionally, the confectionery product obtained by the process described herein may be subjected to a curing process. The curing step could either be applied to evaporate water or to increase the diffusion of the polyol phase into the chocolate phase. During the curing process a part of the water is evaporated to further solidify the structure of the heat resistant chocolate or the heat resistant compound mass of the confectionery product obtained by the process described herein.

The solidification can be achieved by curing at ambient conditions as well as by curing under accelerated conditions such as temperature treatment or microwaving.

The confectionery product produced by the process described herein may be any standard form of heat resistant chocolate or a heat resistant compound mass such as tablets bars and the like.

In addition to solid tablets, the process described herein can dominantly be used for producing a compounded or enrobed confectionery product comprising an interior enrobed with heat resistant chocolate or a heat resistant compound mass, such as filled chocolate or chocolate with inclusion, e.g. chocolate coated wafers, biscuits or the like.

The confectionery product produced by the process described herein may thus be a biscuit, a wafer, nuts, a caramel, or the like comprising heat resistant chocolate or a heat resistant compound mass.

The confectionery product produced by the process described herein may also be a filled chocolate (or compound) tablet in which a heat resistant shell and/or bottom are/is prepared in the described way, while the filling is made of any state-of-the-art technology such as fat-based fillings, fondants, caramels or the like.

No limitations are made concerning the three dimensional structure of the confectionery product.

If the confectionery product produced by the process described herein is a biscuit, a wafer, nuts, a caramel, or the like comprising heat resistant chocolate or a heat resistant compound mass, the biscuit, the wafer, the nuts, the caramel, or the like used as centers and the chocolate or the compound mass and the water or the polyol solution have the same (or similar, meaning +/−2° C.) temperature during the process described herein.

In the same way if solid tablets or filled tablets comprising heat resistant chocolate or a heat resistant compound mass are produced, the moulds have the same (or similar, meaning +/−2° C.) temperatures as the chocolate or the compound mass.

As regards the particular temperature at which the process described herein is performed in this case, the same applies as set forth above.

However, during the process described herein it is also possible that the centers exhibit a lower temperature than the chocolate or the compound mass and the water or the polyol solution, but their temperature should not be below room temperature (20° C.).

In one embodiment, if the confectionery product produced by the process described herein is a compounded or enrobed product, it may fully be coated with heat resistant chocolate or a heat resistant compound mass. In this case, the coating is applied in two steps: in step 1 one side is coated and in step 2 the opposite side is coated.

In another embodiment, if the confectionery product produced by the process described herein is a compounded or enrobed product, it may only partially be coated with heat resistant chocolate or a heat resistant compound mass.

The term "partially coated" as used herein means that only a first portion of the confectionary product's surface is coated while at least a second portion remains uncoated.

The partial coating may be applied in one or more steps. In case more than one step is accomplished, the sides to be coated may be subjected to the process described herein in an arbitrary sequence.

Within the heat resistant chocolate or the heat resistant compound mass, the amount of the polyol is in a range of 5-35% by weight and preferably of 2-17% by weight.

The chocolate, which may be used in the process described herein, may be milk chocolate, dark chocolate or white chocolate.

In one embodiment the chocolate used in the process described herein contains a surfactant.

In a preferred embodiment, the chocolates used in the process described herein always contain a surfactant.

The surfactants, which may be contained in the chocolate, include, but are not limited to, polyglycerol polyricinoleate (PGPR) and lecithin. Also, any other surfactant may be used as long as the specifications for rheology are met. Preferably, PGPR is applied.

In a preferred embodiment the chocolate contains a surfactant, preferably PGPR, in an amount of 0.1-0.5% by weight and preferably in an amount of 0.3-0.5% by weight.

In a further embodiment the chocolate has a fat content in a range between 28 and 31% by weight. Preferably there is no restriction in the fat content.

In another embodiment, the chocolate is tempered prior to spraying. For the tempering process conventional means can be applied.

The compound mass, which may be used in the process described herein, may be based on different recipes and specifically on different fat systems such as CBR (Cocoa butter replacer), CBS (cocoa butter substitutes) or the like.

The polyols, which may be used in the process described herein, include sugar alcohols such as sorbitol, mannitol, maltitol, erythritol, xylitol, lactitol or the like or any mixtures thereof and sugars such as glucose, fructose, sucrose, etc., as well as oligomeric or polymeric sugars or any mixtures thereof.

In addition, liquid polyols such as glycerol can be used. Preferably, sorbitol is used.

The polyol solutions employed in the process described herein are aqueous solutions and can be sprayed in any concentration.

In a preferred embodiment, a saturated polyol solution in water is employed. Thus, depending on the type of the polyol(s), the water/polyol ratio may vary. For sorbitol, a saturated solution exhibits a water/sorbitol ratio of 30/70. Other polyols may exhibit different water/polyol ratios.

It is also possible to use a less concentrated solution e.g. exhibiting a water/polyol ratio of 40/60, 50/50, 75/25 or 100/0.

Also pure liquid polyols or aqueous solutions thereof in any concentration may be employed in the process described herein. Preferably, saturated aqueous solutions of liquid polyols are sprayed.

Alternatively, the polyols can be incorporated in a carrier such as an emulsion.

Any combinations of different polyols may be applied.

There is also provided an apparatus for producing a confectionery product comprising a means for spraying water or a polyol solution onto chocolate or a compound mass The apparatus provided herein may further comprise a means for spraying chocolate or a compound mass.

FIG. 1 shows one embodiment of an apparatus provided herein. Therein, the chocolate or the compound mass and the water or the polyol solution are each withdrawn from the pressurized tanks 10 and 20, respectively. Said tanks allow for adjusting the temperature of their content and are pressurized by an air, oxygen or an inert gas stream, such as nitrogen gas, which is supplied via the pipes 11 and 21. The chocolate or the compound mass and the water or the polyol solution are fed through the pipes 12 and 22, respectively, to the one fluid spray nozzles 13 and 23. The pipes 12 and 22 each comprise a tempering jacket. For spraying the chocolate or the compound mass and the water or the polyol solution with spray nozzles 13 and 23, an atomizing gas (air, oxygen or an inert gas, such as nitrogen gas) is supplied via the pipes 14 and 24 to the respective nozzle. The chocolate or the compound mass and the water or the polyol solution either may be sprayed in order to form a confectionary product 15 on the tray 16 or may be sprayed onto a substrate 17 placed on the tray 16.

In the process/apparatus described herein, the means for spraying water or a polyol solution and the means for spraying chocolate or a compound mass is an atomizing spray nozzle. The atomizing spray nozzles applied in the process/apparatus may be one fluid or two fluid spray nozzles.

An example of a one fluid spray nozzle is the nozzle 13 or the nozzle 23 of FIG. 1.

Figure 2:
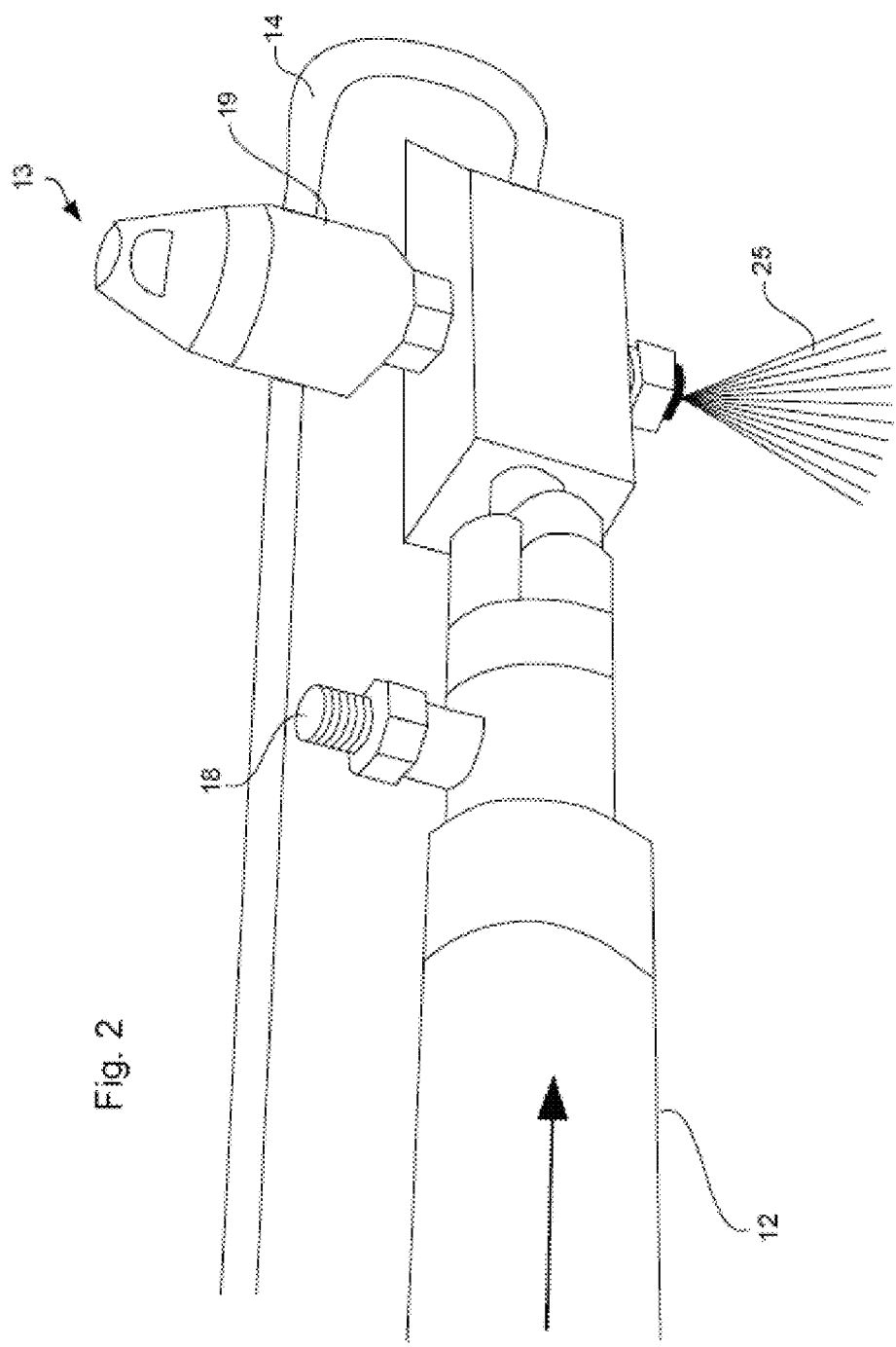
FIG. 2 shows a one fluid nozzle used in the process/apparatus provided herein.

FIG. 2 shows the nozzle 13. Chocolate, compound mass, water or a polyol solution is fed to the nozzle 13 through the jacketed pipe 12. Water for adjusting the temperature of the liquid fed through the pipe 12 is supplied via the inlet 18. Concurrent to the chocolate, the compound mass, the water or the polyol solution an atomizing gas (air, oxygen or an inert gas, such as nitrogen gas) is supplied via the pipe 14 to the nozzle 13. In the nozzle head 19, the atomizing gas expands thereby inducing the spray-cone 25 of chocolate, compound mass, water or a polyol solution.

In addition, the disclosure relates to a confectionery product obtainable by the above described process.

EXAMPLES

Example 1

Production of the Confectionery Base

Ingredients for the chocolate confection of the 'Milk Chocolate Confection' No. 1 or No. 2 were mixed and refined according to Table 1. Mixing of ingredients (with a certain amount of fat and no lecithin) was carried out in a double-jacketed blender (Stephan® mixer, Hameln, Germany) at 50° C. (15 min., 1000 rpm) adjusting the total fat level at 24%. Refining was effected with a pilot plant 3-roll-refiner to a particle size of d90<30 µm (Laser diffraction, Malvern). The base masses were couched with a pilot plant conche (60 kg). The remaining fat and lecithin were added during conching.

TABLE 1

| Confectionery Base | | |
|---|---|---|
| | Milk Chocolate Confection No. 1 | Milk Chocolate Confection No. 2 |
| Sugar | 45.75% | 45.75% |
| Cocoa liquor | 12.35% | 17.50% |
| Cocoa butter | 23.3% | 19.4% |
| Skimmed milk powder | 18.0% | 16.75% |
| Lactose | | |
| Biscuitine ® 300 | | |
| Lecithin | 0.6% | 0.6% |
| Sum | 100% | 100% |

Example 2

Spraying Trials

Spraying Device 1

Filled with Chocolate (Compound) Mass

The above mass was mixed together with polyglycerol polyricinoleate (PGPR, high grade) in order to adjust the flow properties and to ensure a good distribution of the chocolate mass on the surface of the biscuit. Milk chocolate mass without PGPR has a viscosity at 2/s between 22 and 15 Pa·s, whereas the presence of PGPR could lower the viscosity range down to 12-4 Pa·s depending on the amount of PGPR.

The particular viscosity values for the milk chocolate of the above Confection No. 1 containing various amounts of PGPR are as shown in the below table:

| PGPR content (% [w/w]) of Confection No. 1 | Viscosity at 2/s |
| --- | --- |
| 0% PGPR | 15-22 Pa·s |
| 0.1% PGPR | 12 Pa·s |
| 0.2% PGPR | 8 Pa·s |
| 0.3% PGPR | 4 Pa·s |
| 0.5% PGPR | <3 Pa·s |

For this particular application, a good distribution is ensured at a viscosity range between 7 and 5 Pas. This corresponds to a PGPR amount between 0.2 and 0.5% and preferably an amount of 0.35%.

Tempered chocolate is filled in the tank and the pressure is set to 1 bar, whereas the pressure of the air stream is set to 1.5 bar. These parameters ensure a good distribution of chocolate on the surface of a biscuit, which has a diameter between 4 and 6 cm. Furthermore, the distance of the nozzle to the surface of the biscuit is fixed to 8.5 cm for a biscuit with a diameter between 4 to 6 cm.

Spraying Device 2

Sorbitol Solution

A sorbitol solution is used as a moisture carrier, which contains 30% of water.

Figure 3:
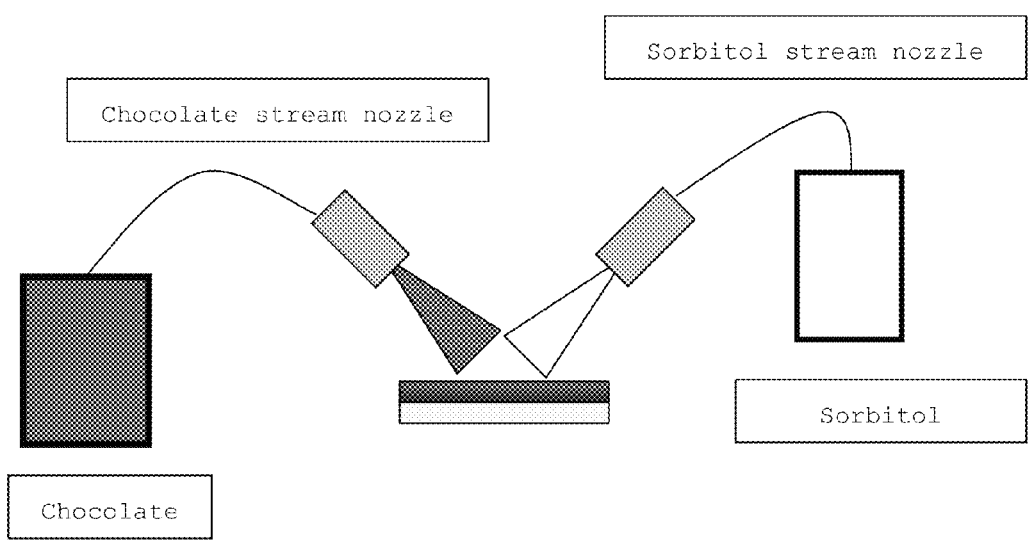
FIG. 3 schematically shows a spraying device used in the process described herein.

The chocolate and the sorbitol solution are sprayed simultaneously with the spraying device shown in FIG. 3.

To spray the sorbitol solution and the chocolate simultaneously, the sorbitol solution is filled into another and separate pressurized tank and the pressure is set to 2.5 bar, whereas the air stream of this spraying system is set to 0.5 bar. All components, such as the chocolate, the sorbitol solution and the biscuit are set to a temperature of 30° C. Three strokes of the nozzle of the chocolate part will deliver about 1.6-1.8 g of chocolate on the surface of the biscuit. Each stroke takes about 5 sec and just before the end of the last stroke of chocolate the sorbitol solution is simultaneously sprayed with the chocolate for 2.5 sec. This will result in a product with 1.6-1.8 g of chocolate and 0.1-0.2 g of the sorbitol solution. After the spraying application, the product is either stored at 5° C. to allow crystallization or at 30° C. to induce the heat resistant character in a short period of time [1 wk].

Example 3

Testing Heat Resistance

Heat resistance of the chocolate layer is the main criteria. At temperatures <30° C., the chocolate should be hard, not sticky and not adhesive when touched with a finger.

Sample Preparation and Storage

A wrapped heat resistant chocolate coated product, which was prepared according to examples 1 and 2 by simultaneously spraying chocolate and a sorbitol solution, was stored in an oven at a temperature of 35° C. or higher (the maximum temperature was 50° C.) for about 2 hours prior to measurement in order to determine its heat resistance. The heat resistant properties were assessed via the product stickiness as analytical parameter.

Analytical Method

The attribute of stickiness is being determined by means of a texture analyzer. A plastic plate/sensor is forced to touch and penetrate the surface of the coated biscuit about 1 mm. The depth of penetration is strongly dependent on the thickness of the chocolate layer, i.e. the coated part of the biscuit. As soon as the plate touches and penetrates the chocolate, the positive force [g] is recorded. The positive force [g] determines the hardness of the coated part of the biscuit, i.e. the chocolate. Thereafter, the plate moves upwards and the negative force is recorded. The negative force determines the stickiness. As mentioned above, the product is placed at different temperatures for about 2 hours prior any measurement. If the chocolate layer is not heat resistant, then the heat treatment will force the chocolate to melt. The melted chocolate will stick to the plate/sensor while the latter starts moving upwards. If the chocolate layer is heat resistant, the coated biscuit will not stick to the sensor and the negative force will be zero. For a product which will not be sticky (and hence be a heat resistant product), the negative force will be zero. For a product which will stick to the plate/sensor (and hence is a non heat resistant product), the negative force will be below zero (negative values; unit: [g]).

Procedure

The product was placed on the measurement platform. A 6-fold determination was performed.

Results

Heat resistance of all tested products was proven at temperatures equal to 35° C. and up to 50° C.

What is claimed is:

1. A process for producing a confectionery product comprising;
    simultaneously spraying a liquid with one of chocolate or a compound mass so that the liquid mixes with the chocolate or compound mass to form a confectionery mixture, the liquid comprising a material selected from the group consisting of water, polyol, and combination thereof, wherein when the liquid is sprayed with the chocolate, the liquid and chocolate are at a temperature of 29° C. to 35° C. or when the liquid is sprayed with the compound mass, the liquid and compound mass are at a temperature of 30° C. to 45° C., the temperature being maintained for a period such that the liquid mixes with the chocolate or compound mass; and
    curing the confectionery mixture to provide a solidified confectionery product.

2. The process according to claim 1, wherein the chocolate is milk chocolate, dark chocolate or white chocolate.

3. The process according to claim 1, wherein the compound mass comprises a fat system selected from the group consisting of cocoa butter replacer, cocoa butter substitute, and combinations thereof.

4. The process according to claim 1, wherein the polyol is selected from the group consisting of sugar, sorbitol, mannitol, maltitol, erythritol, xylitol, lactitol, glycerol, and combinations thereof.

5. The process according to claim 1, wherein the liquid and the chocolate or compound mass have the same temperature.

6. The process according to claim 5, wherein the chocolate and liquid are at a temperature of 29-31.5° C.

7. The process according to claim 1, wherein the chocolate or compound mass is sprayed using a compressed air stream at a pressure of 0.5-1.5 bar.

8. The process according to claim 1, wherein the liquid is sprayed using a compressed air stream at a pressure of 0.5 bar.

9. The process according to claim 1, wherein simultaneously spraying provides at least one homogenous layer.

10. The process according to claim 1, wherein the solidified confectionery product is in the form of a solid or enrobed product selected from the group consisting of an enrobed biscuit, enrobed wafer, enrobed caramel, filled chocolate, solid tablet, filled tablet, and enrobed nuts.

11. The process according to claim 1, wherein the curing occurs at ambient conditions.

12. The process according to claim 1, wherein the curing comprises microwaving.

13. The process according to claim 1, wherein the liquid is sprayed simultaneously with one of chocolate or a compound mass onto a substrate selected from the group consisting of a mold, a tray, and a food product.

14. A process for producing a confectionery product comprising:
    simultaneously spray-depositing chocolate from a first nozzle and a liquid comprising a material selected from the group consisting of water, polyol, and combination thereof from a second nozzle to provide a confectionery product formed of at least one homogenous layer of the chocolate and liquid, the chocolate and liquid each at a temperature of 29° C. to 35° C.; and
    curing the confectionery product to provide a solidified confectionery product.

15. The process according to claim 14, wherein the chocolate is milk chocolate, dark chocolate or white chocolate.

16. The process according to claim 14, wherein the polyol is selected from the group consisting of sorbitol, mannitol, maltitol, erythritol, xylitol, lactitol, glycerol, and combinations thereof.

17. The process according to claim 14, wherein the chocolate and liquid are spray-deposited at a temperature of 29° C. to 35° C.

18. The process according to claim 14, wherein the solidified confectionery product is in the form of a solid or enrobed product selected from the group consisting of an enrobed biscuit, enrobed wafer, enrobed caramel, filled chocolate, solid tablet, filled tablet, and enrobed nuts.

19. The process according to claim 14, wherein curing comprises treatment at ambient conditions or by microwaving.

20. The process according to claim 14, wherein the liquid is sprayed simultaneously with the chocolate onto a substrate selected from the group consisting of a mold, a tray, and a food product.

21. A process for producing a confectionery product comprising:
    simultaneously spray-depositing a compound mass from a first nozzle and a liquid comprising a material selected from the group consisting of water, polyol, and combination thereof from a second nozzle to provide a confectionery product formed of at least one homogenous layer of the compound mass and liquid, the compound mass and liquid each at a temperature of 30° C. to 45° C.; and
    curing the confectionery product to provide a solidified confectionery product.

22. The process according to claim 21, wherein the compound mass comprises a fat system selected from the group consisting of cocoa butter replacer, cocoa butter substitute, and combinations thereof.

23. The process according to claim 21, wherein the polyol is selected from the group consisting of sorbitol, mannitol, maltitol, erythritol, xylitol, lactitol, glycerol, and combinations thereof.

24. The process according to claim 21, wherein the compound mass and liquid are spray-deposited at a temperature of 30° C. to 45° C.

25. The process according to claim 21, wherein the solidified confectionery product is in the form of a solid or enrobed product selected from the group consisting of an enrobed biscuit, enrobed wafer, enrobed caramel, filled chocolate, solid tablet, filled tablet, and enrobed nuts.

26. The process according to claim 21, wherein curing comprises treatment at ambient conditions or by microwaving.

27. The process according to claim 21, wherein the liquid is sprayed simultaneously with the compound mass onto a substrate selected from the group consisting of a mold, a tray, and a food product.

* * * * *